United States Patent Office 3,016,334
Patented Jan. 9, 1962

3,016,334
SKIN CREAM CONTAINING LOW GEL STRENGTH, LOW VISCOSITY GELATIN
Thomas J. Lewis, 20 E. 90th St., New York 28, N.Y.
No Drawing. Filed Nov. 24, 1958, Ser. No. 775,724
9 Claims. (Cl. 167—91)

This invention relates to an improved skin cream for topical cosmetic application, useful as a film forming cream for the increasing and conserving of skin moisture and, therefore, beneficial in improving skin tone or texture. More particularly, the invention relates to a cosmetic skin cream of the class described, comprising a water-in-oil type emulsion providing a cream base wherein the water phase contains a low gel strength, low viscosity, gelatin derived from collagen protein as an active agent instrumental in enhancing the absorption of water by the skin. This application is a continuation-in-part of my prior application Serial No. 690,898, filed October 18, 1957 now abandoned.

Many cosmetic skin creams currently in use comprise water-in-oil type emulsions, and while there is considerable variation in the specific formulations making up the oil and water phase of such emulsions, a component found in many such creams as part of the oil phase thereof is lanolin or a mixture thereof with purified lanolin fractions. One of the purposes of many such creams is to add moisture to the skin, but to varying extents preparations currently available leave much to be desired in attaining this purpose.

I have now discovered that the performance of cosmetic skin creams in increasing and conserving the moisture in the skin can be markedly enhanced by incorporating in such skin creams, as part of the aqueous phase, a special type of gelatin derived from collagen protein in an amount within the range of about 3 to 15% and suitably about 10% based on the total weight of the cream. Collagen protein is the protein found in the connective tissue of man and of many animals, and gelatins derived therefrom are extremely rich in amino acids which apparently constitute essential "building blocks" of the collagen protein per se. In general, collagen protein gelatins derived from animal skins such as calfskin and porkskin are suitable for my purpose. The gelatin should, however, preferably have a somewhat acid pH so that when combined with other components the resulting cream will have a pH near the pH of the skin, i.e. normally within the range of pH 5.0 to 6.5. It is found that gelatin obtained by acid hydrolysis of animal skins and having very low viscosity and very low gel strength, is the most suitable, readily available collagen protein gelatin for use in my improved skin creams.

The preparation, composition, and properties of such acid hydrolyzed gelatin are described in a publication, "Gelatin," by the Gelatin Research Society of America, Inc. (1954), and it is there indicated that such acid hydrolyzed (or type A) gelatin has the following approximate nitrogen and amino acid composition, expressed in percent by weight:

| Component: | In percent |
|---|---|
| Nitrogen | 18.0 |
| Alanine | 9.2 |
| Glycine | 30.5 |
| Valine [1] | 2.7 |
| Leucine [1] | 3.2 |
| Isoleucine [1] | 1.5 |
| Proline | 16.3 |
| Phenylalanine [1] | 2.1 |
| Tyrosine | 0.69 |
| Tryptophen [1] | — |
| Serine | 2.9 |
| Threonine [1] | 2.2 |
| Cystine | 0.09 |
| Methionine [1] | 0.80 |
| Arginine [1] | 8.8 |
| Histidine [1] | 0.67 |
| Lysine [1] | 5.1 |
| Aspartic acid | 6.3 |
| Glutamic acid | 11.7 |
| Hydroxyproline | 13.1 |

[1] Those listed as "essential" amino acids in human nutrition.

Other characterizing data for the special gelatin useful in the improved skin creams include:

| | |
|---|---|
| pH | 4.0–6.0 |
| Isoelectric point (pH) | 6.5–8.5 |
| Gel strength (Bloom gms.) | 40–80 |
| Viscosity (millipoises) (6–2/3% solution at 60° C.) | 12–20 |
| Ash (1%) (principally NaCl) | 0.3–1.0 |

In a typical preparation of such gelatin a skin stock (for instance porkskin) is conditioned in dilute hydrochloric acid at 65 to 75° F. for a number of hours. The acid is then drained off and the skin washed with cold water until its pH value has been raised to about 4.0. Finally the skin is hydrolyzed to gelatin by means of hot water. During this hydrolysis, four successive hot water treatments are employed, each one giving gelatin of lower test, (i.e. lower Bloom and viscosity) than the preceding treatment. The gelatin having the characterizing data tabulated immediately above comes from the fourth such hot water hydrolysis, and represents a gelatin which normally finds use in combination with very high test gelatin for certain photographic purposes, gelatin capsules, and the like to obtain materials of intermediate ratings as to gel strength and viscosity.

In view of the high nutrient properties of gelatin for microorganisms, a small amount of suitable preservative should be incorporated with the gelatin in the aqueous phase when compounding a cosmetic cream. A typical preservative for this purpose is benzoic acid in the amount of about 0.05 to 0.5% based on the weight of gelatin employed. A number of other suitable preservatives and the relative amounts thereof required are described in the bulletin above mentioned.

In preparing my improved skin creams the collagen protein gelatin can be incorporated in any good cream base in the amount of about 3 to 15% and preferably about 10% of the weight of the finished cream. In this connection, the collagen protein gelatin and the required amount of preservative are dissolved in the water phase prior to addition of the water phase to the oil phase in the actual emulsion or cream formation.

Particularly good results are obtained when the low viscosity, low gel strength, collagen protein gelatin is incorporated in a cream base containing lanolin, a mixture of petrolatum and light mineral oil, and beeswax as components of the oil phase, with a small amount of borax being incorporated in the water phase to counteract the beeswax.

As generally illustrative of complete cream formulations of this type, it will be understood that the aqueous phase and the oil phase may contain the following components, percentages being based on percentages by weight of the finished cream:

WATER PHASE

| Component: | Percent |
|---|---|
| Collagen protein gelatin | 3.0–15.0 |
| Acid hydrolyzate of animal skin having— | |
| Gel strength—Bloom gms. | 40–80 |
| Viscosity—millipoises | 12–20 |
| pH | 4.0–6.0 |
| Benzoic acid | 0.01–0.5 |
| Borax | 0.5–2.0 |
| Water | 20.0–60.0 |
| Propylene glycol (or other similar surface active material)[1] | 2.0–6.0 |

[1](The surface active agent is non-essential and can be omitted if desired.)

OIL PHASE

| | |
|---|---|
| Lanolin | 10.0–20.0 |
| Cholesterol | 1.0–4.0 |
| Petrolatum (yellow or white) | 7.0–12.0 |
| Light mineral oil (Saybolt Viscosity 50–55) | 15.0–35.0 |
| Beeswax | 10.0–20.0 |

In the foregoing tabulations certain substitutions and variations can be made. For example, in place of part or all of the propylene glycol, I can use low polymers of ethylene or propylene glycol, or mixed polymers or ethylene and propylene glycol, having surface active properties as, for example, a product of Carbide and Carbon Chemicals Company, identified as UCON 50–HB 400 or 660. A small amount of hydrogenated vegetable oil such, for example, as Crisco can be substituted for part of the lanolin, as, for example, about 2% in the finished cream. Certain vegetable oils such as cotton seed oil or sesame oil with preservatives can be substituted for part of the light mineral oil, to the extent of about 5% in the finished cream. Also in place of part of the lanolin and up to about 4% in the finished cream, I can employ a purified lanolin derivative or purified lanolin fraction such, for example, as the product sold by the Malmstrom Chemical Corp. under the trademark Lantrol. Lantrol is a crystal clear, light amber colored liquid lanolin fraction, without the characteristic lanolin odor, and having the following physical and chemical characteristics:

| | |
|---|---|
| Fatty acid (U.S.P.) | 0.56% max. |
| Total sterols (unsaponifiable content) U.S.P. | 50–60%. |
| Cholesterol in unsaponifiable (B.P.) | 30–35%. |
| Cholesterol in Lantrol approx. | 20%. |
| Color (A.S.T.M.) | 2–2½. |
| Odor | Bland. |
| Loss on drying (200° F. 24 hr.) | None. |
| Ash (U.S.P.) | 0.02%. |
| Iodine value (U.S.P.) | 18–36. |
| Cloud point (A.S.T.M.) D–97–47 | 64°F. max. |
| Pour point (A.S.T.M.) D–97–47 | 50°F max. |

The procedure for preparing my improved cosmetic creams corresponds quite closely with procedures generally used for preparing such creams. With respect to handling of the collagen protein gelatin, however, this component is preferably added to about three times its weight of cold water (which should be of low iron content); the mixture is then stirred slowly until all lumps are dissolved. The mixture is then heated, suitably to the boiling point, and stirred until clear and then allowed to cool, at which point the preservative, such as benzoic acid, is added and stirred in thoroughly. Other components of the water phase are then combined with this material and the complete water phase is mixed into the oil phase to form the water-in-oil emulsion or cream.

The following examples show complete formulations for typical cosmetic creams in accordance with the present invention, but it is to be understood that these examples are given by way of illustration and not of limitation.

Example I

A cosmetic cream is prepared as a water-in-oil emulsion, wherein the oil phase and the aqueous phase have the following composition:

OIL PHASE

| Component: | Parts by weight |
|---|---|
| Anhydrous lanolin | 13.5 |
| Petrolatum, white (or yellow) | 8.0 |
| Light mineral oil (Saybolt viscosity 50–55) | 18.0 |
| Beeswax | 12.0 |
| Cholesterol | 1.0 |
| Purified lanolin fraction (Lantrol) | 1.5 |

AQUEOUS PHASE

| | |
|---|---|
| Water | 30.0 |
| Collagen protein gelatin | 10.0 |
| Acid hydrolyzate of porkskin having: | |
| Gel strength—Bloom gms. | 52 |
| Viscosity—millipoises | 14.4 |
| pH | 4.34 |
| Benzoic acid | 0.2 |
| Borax | 1.2 |
| Propylene glycol | 5.0 |

The several components of the oil phase are blended together to provide a uniform mixture. The collagen protein gelatin is then dissolved in about three times its weight of water (in this instance the total water to be used) by stirring in the cold water until all lumps are dissolved, then heating to boiling and continuing heating with stirring until a clear solution is obtained. After allowing the gelatin solution to cool, the other components of the aqueous phase are dissolved and the aqueous phase is added to the oil phase with suitable agitation to provide a uniform creamy emulsion.

In this formulation a portion or all of the propylene glycol can be replaced by a mixed condensate of ethylene glycol and propylene glycol, such as the product UCON 50–HB 400 or 660, distributed by Carbide and Carbon Chemicals Company. In addition, the lanolin fraction (Lantrol) can be omitted, in which instance the amount of anhydrous lanolin would be increased to about 15 parts by weight. It should also be noted that when dissolving the gelatin, heating to boiling is not essential, although it is preferred in view of the time required to obtain a clear solution at lower temperatures.

Example II

A cosmetic cream is prepared as a water-in-oil emulsion, wherein the oil phase and the aqueous phase have the following compositions:

OIL PHASE

| Component: | Parts by weight |
|---|---|
| Anhydrous lanolin | 15.0 |
| Petrolatum, white (or yellow) | 8.0 |
| Light mineral oil (Saybolt viscosity 50–55) | 23.0 |
| Beeswax | 12.0 |
| Cholesterol | 1.0 |

AQUEOUS PHASE

| | |
|---|---|
| Water | 30.0 |
| Collagen protein gelatin | 10.0 |
| Acid hydrolyzate of porkskin having: | |
| Gel strength—Bloom gms. | 52 |
| Viscosity—millipoises | 14.4 |
| pH | 4.34 |
| Benzoic acid | 0.5 |
| Borax | 1.2 |
| Propylene glycol | 5.0 |

The components of the oil phase and the aqueous phase are separately combined and the aqueous phase then added to the oil phase to form the cream emulsion as described in Example I.

*Example III*

A cosmetic cream is prepared as a water-in-oil emulsion, wherein the oil phase and the aqueous phase have the following composition:

OIL PHASE

| Component: | Parts by weight |
|---|---|
| Anhydrous lanolin | 15.0 |
| Petrolatum, white (or yellow) | 8.0 |
| Light mineral oil (Saybolt viscosity 50–55) | 30.0 |
| Beeswax | 10.0 |
| Cholesterol | 1.0 |

AQUEOUS PHASE

| | |
|---|---|
| Water | 31.5 |
| Collagen protein gelatin | 3.5 |
| Acid hydrolyzate of porkskin having: | |
| Gel strength—Bloom gms. | 52 |
| Viscosity—millipoises | 14.4 |
| pH | 4.34 |
| Benzoic acid | 0.01 |
| Borax | 1.0 |

The components of the oil phase and the aqueous phase are separately combined and the aqueous phase then added to the oil phase to form the cream emulsion as described in Example I.

With this formulation which contains no propylene glycol or other similar surface active agent, a satisfactory cream is obtained. This formulation can be modified, however, to include about 5 parts by weight of a surface active agent as indicated in Example I.

It will, of course, be recognized that in cosmetic creams it is customary to include trace amounts of essential oils or the like to provide a desired scent or odor in the product. These have been omitted from the formulations in the foregoing examples since the odor characterization of products of this sort can be widely varied to suit the desires of the particular manufacturer or distributor. It will be noted, however, that perfume oils, and coloring agents if desired, would normally be incorporated in the oil phase prior to emulsion formation by addition of the aqueous phase.

Skin creams containing low gel strength, low viscosity, collagen protein gelatin and prepared as described in the foregoing examples have been found in actual use to leave on the skin a light invisible film having a generally beneficial effect on skin tone and texture, and apparently enhancing the moisture absorbing and moisture retaining properties of the skin. While originally developed as superior cosmetic creams, the skin creams have been found in clinical testing to be useful dermatologic therapeutic agents.

Various changes and modifications in the protein-containing skin creams herein described will occur to those skilled in the art, and to the extent that such changes and modifications are embraced by the appended claims it is to be understood that they constitute part of my invention.

I claim:

1. A cosmetic film forming cream for enhancing the moisture absorbing and moisture retaining properties of the skin, comprising a cream base which is an emulsion of the water-in-oil type having incorporated in the aqueous phase thereof an amount within the range of about 3 to 15% based on the weight of the finished cream of a collagen protein gelatin which is an acid hydrolyzate of animal skin, and which has a gel strength below about 50 Bloom gms. and a viscosity below about 20 millipoises.

2. A cosmetic cream as defined in claim 1 wherein said collagen protein gelatin is an acid hydrolyzate of animal skin having a gel strength of about 40–80 Bloom gms., a viscosity of about 12 to 20 millipoises, and a pH of about 4.0 to 6.0.

3. A cosmetic cream as defined in claim 1 wherein said collagen protein gelatin is an acid hydrolyzate of porkskin having a gel strength of about 52 Bloom gms., a viscosity of about 14.4 millipoises and a pH of about 4.3.

4. A cosmetic film forming cream for enhancing the moisture absorbing and moisture retaining properties of the skin, comprising a creamy emulsion of the water-in-oil type wherein, based upon the weight of the finished cream, the oil phase contains about 10 to 20% lanolin, 1 to 4% cholesterol, 7 to 12% petrolatum, 15 to 35% light mineral oil, and 10 to 20% beeswax; and the aqueous phase contains about 3 to 15% of a collagen protein gelatin, which has a gel strength below about 80 Bloom gms. and a viscosity below about 20 millipoises, .01 to .5% preservative for said gelatin, 0.5 to 2.0% borax, 20 to 60% water, and a surface active agent, if present, in the amount of about 2 to 6%.

5. A cosmetic cream as defined in claim 4, wherein the lanolin component of the oil phase includes a mixture of anhydrous lanolin and purified lanolin fractions.

6. A cosmetic cream as defined in claim 4, wherein the collagen protein gelatin component of the aqueous phase comprises an acid hydrolyzate of animal skin having a gel strength of about 40–80 Bloom gms., a viscosity of about 12–20 millipoises, and a pH of about 4.0 to 6.0.

7. A cosmetic cream as defined in claim 4, wherein the collagen protein gelatin component of the aqueous phase comprises an acid hydrolyzate of porkskin having a gel strength of about 52 Bloom gms., a viscosity of about 14.4 millipoises, and a pH of about 4.3.

8. The process for preparing a cosmetic cream in the form of an emulsion of the water-in-oil type containing, as a component of the aqueous phase, a collagen protein gelatin which has a gel strength below about 80 Bloom gms. and a viscosity below about 20 millipoises, that comprises adding the collagen protein gelatin to about three times its weight of cold water, stirring until all of the gelatin is dissolved, heating and stirring until the solution is clear, then allowing the solution to cool, combining the same with other components of the aqueous phase, and combining the aqueous phase with the oil phase to form the water-in-oil emulsion.

9. A cosmetic preparation for enhancing the moisture absorbing and moisture retaining properties of the skin comprising about 3 to 15% by weight of an essential active ingredient consisting of a collagen protein gelatin having a gel strength below about 80 Bloom gms. and a viscosity below about 20 millipoises, and about 85 to 97% by weight of an aqueous mixture, including about 0.01 to 0.5% of a preservative for said gelatin and a plurality of other components, providing a carrier adapted for cosmetic application to the skin.

References Cited in the file of this patent

UNITED STATES PATENTS

| 372,852 | Knaggs | Nov. 8, 1887 |
| 415,208 | Johnson | Nov. 19, 1889 |
| 2,834,683 | Corben | May 13, 1958 |

OTHER REFERENCES

Winter: Handbuch der Gesamten Parf. and Kos. Springer Verlag, Vienna, Aust. 1952 pp. 848–850.

Bennett: Cos. Formulary, Chem. Pub. Co. N.Y. 1937, pp. 1–8, 21–24.

Pharm. Form., The Chem. Drug., London, 11th ed., 1944, vol. I, pp. 212–217, vol. II, pp. 78–81.

U.S. Disp.: J. B. Lippincott Co., Phila., 24th ed., 1947, pp. 494–496.

Amer. Prof. Pharm. 20:1, Oct. 10, 1954.